United States Patent
Lodeiro et al.

(10) Patent No.: US 10,235,159 B2
(45) Date of Patent: Mar. 19, 2019

(54) SYSTEM AND METHOD FOR PROVIDING AUTOMATIC FIRMWARE UPDATE MANAGEMENT

(71) Applicant: Intraway R&D S.A., Montevideo (UY)

(72) Inventors: Lucas Lodeiro, Buenos Aires (AR); Matias Torchinsky, Buenos Aires (AR); Leandro Rzezak, Buenos Aires (AR)

(73) Assignee: Intraway R&D S.A., Montevideo (UY)

( * ) Notice: Subject to any disclaimer, the term of this patent is extended or adjusted under 35 U.S.C. 154(b) by 0 days.

(21) Appl. No.: 15/682,905

(22) Filed: Aug. 22, 2017

(65) Prior Publication Data

US 2018/0052677 A1   Feb. 22, 2018

Related U.S. Application Data (60) Provisional application No. 62/377,703, filed on Aug. 22, 2016.

(51) Int. Cl.

| | |
|---|---|
| *G06F 9/445* | (2018.01) |
| *G06F 8/65* | (2018.01) |
| *H04L 29/08* | (2006.01) |
| *G06F 8/654* | (2018.01) |

(52) U.S. Cl.
CPC .............. *G06F 8/65* (2013.01); *G06F 8/654* (2018.02); *H04L 67/06* (2013.01); *H04L 67/34* (2013.01); *H04L 67/02* (2013.01)

(58) Field of Classification Search
CPC .......... G06F 8/645; H04L 67/06; H04L 67/34
See application file for complete search history.

(56) References Cited

U.S. PATENT DOCUMENTS

| | | | |
|---|---|---|---|
| 7,573,936 B2 * | 8/2009 | Hung | H04N 21/4182 375/222 |
| 9,787,616 B2 * | 10/2017 | Xu | H04L 67/06 |
| 2003/0167373 A1 | 9/2003 | Winters et al. | |
| 2011/0093595 A1 | 4/2011 | Siripunkaw et al. | |
| 2014/0282484 A1 * | 9/2014 | Lazar | G06F 8/65 717/173 |
| 2017/0039372 A1 * | 2/2017 | Koval | H04L 67/06 |

OTHER PUBLICATIONS

European Search Report for EP17001420.3 dated Feb. 8, 2018.

* cited by examiner

*Primary Examiner* — Hanh Thi-Minh Bui
(74) *Attorney, Agent, or Firm* — Peter A. Nieves; Sheehan Phinney Bass & Green PA (57) ABSTRACT

A method for updating firmware of cable modems optimizing management resources in a network comprising a web application, network collector, more than one cable modem, one or more servers. The method includes the web application receiving an update firmware policy, the policy defined by a list of cable modems to have their firmware updated, a Uniform Resource Identifier (URI) pointing to a file within a server in the network, and the web application adding a policy with this information to a policies table. The network collector polls a database engine for a new policy and computing a list of cable modems to have their firmware updated, and the network collector sends a command to a cable modem to update to a new firmware, wherein the new firmware is specified by the URI.

17 Claims, 5 Drawing Sheets

SYSTEM AND METHOD FOR PROVIDING AUTOMATIC FIRMWARE UPDATE MANAGEMENT

CROSS-REFERENCE TO RELATED APPLICATIONS

The present invention claims benefit to provisional patent application Ser. No. 62/377,703, which was filed on Aug. 22, 2016, having the title "SYSTEM AND METHOD FOR PROVIDING AUTOMATIC FIRMWARE UPDATE MANAGEMENT", and which is incorporated by reference in its entirety.

FIELD OF THE INVENTION

The present invention relates generally to the means that a cable operator can use to maintain up to date firmware run by cable modems in its network. More specifically, it relates to a system and method for easing management of the complex update procedures for the cable modem population.

BACKGROUND OF THE INVENTION

A cable operator, or any communication or content distribution business that operates through a cable network, renders its services to its subscribers. The services include, but are not limited to, different subscription plans for broadband Internet access and telephony. Each subscription is typically tied to a specific address where the service is received.

In order to consume these services, subscribers connect to a private network owned (or co-owned or rented) by the cable operator which is implemented according to the Data Over Cable Service Interface Specification (DOCSIS for short) standard.

Subscribers connect their computers, routers, voice-over-IP telephones and other devices to this network through the network terminals, called cable modems. A cable modem (CM for short) is a piece of hardware which runs a form of software that is referred to as firmware. This firmware is developed by the different cable modem vendors (e.g., Cisco, Arris) and distributed to the cable operators. The firmware may contain bugs or lack features, and the cable modem vendors will develop and distribute new firmware versions. In turn, a cable operator will receive firmware updates, and evaluate whether he wants to approve (or homologate) a new firmware version and push the firmware update to its subscribers.

The cable operator usually provides cable modems, typically coming from a variety of cable modem vendors and in different models and versions, to its subscribers upon subscription. At the time of delivering the cable modem to a new subscriber, the cable operator can ensure that it is running the latest version of firmware that has been homologated. Subscribers may provide a cable modem by their own means. The cable operator issues (approved and) updated versions of the firmware from time to time that it needs to roll out to its complete subscriber population to which the update applies (as an example, to all Cisco cable modems). Deploying these new firmware versions and ensuring that the complete subscriber population performs the update successfully, is typically problematic. While not inclusive of all reasons, a few problematic reasons follow.

First, the population of cable modems consists of a heterogeneous mix of manufacturer's, hardware and firmware versions, which the cable operator may not be able to track accurately. Consequently, the cable operator may not be able to create tests and ensure that the updates will work for all the population. The updates are prone to failure in these exceptional cases.

Second, no matter what action the cable operator takes, it cannot enforce updates. For example, a particular subscriber could have disconnected his CM during a long period of absence or he may use a cable modem which has been modified in some way so that remote management operations, and in particular updates, fail. The cable operator must then track the successful firmware updates, the failed updates and the CMs that have not been updated.

Third, the network and its equipment are not prepared for servicing all the updates simultaneously, as there may be bottlenecks at different stages of an update. These bottlenecks may cause updates to fail or get postponed and have a negative impact in service—for example by reducing the quality of the broadband service that subscribers are paying for.

Fourth, during a cable modem's update procedure, the cable modem must be rebooted and then the services it renders get interrupted. What is more, when these cable modems also provide telephony, an ongoing phone conversation could be dropped. Since the cable operator wants to limit unavailability, in particular when a telephone conversation is taking place, he must choose the updating moment with additional care so it becomes imperceptible to the subscribers.

Fifth, the cable operators have grown a complex and expensive platform to support their business, so that any solution to the firmware update problem will need to be compliant with the platform.

Sixth, when the service is reestablished after a cable modem termination system (CMTS) or network outage, many cable modems will reconnect and might be forced to update by a standard update solution. Yet, updating all these cable modems in an uncoordinated fashion would imply a heavy resource consumption with an unsatisfactory impact to subscribers.

Seventh, cable operators will release both firmware updates and also changes in the configuration files. The cable modems will load these configuration changes when rebooting. A faulty firmware may cause the cable modem to reboot several times and cause discomfort in the subscribers. A faulty configuration may cause the upgrade to fail, and the cable modem to reboot using the old configuration. The cable operator must be prepared to detect these problems and rollback the configuration change before it continues to impact other subscribers. These kinds of problems are often tackled by cable operators by a manual and tedious procedure where reboots are manually monitored.

Thus, a heretofore unaddressed need exists in the industry to address the aforementioned deficiencies and inadequacies.

SUMMARY OF THE INVENTION

Embodiments of the present invention provide a system and method for providing automatic firmware update management. Briefly described, one embodiment, among others, the method can be broadly summarized by the following steps. The method is for updating firmware of cable modems optimizing management resources in a network comprising a web application, network collector, more than one cable modem, one or more servers. The method includes the web application receiving an update firmware policy, the policy defined by a list of cable modems to have their firmware updated, a Uniform Resource Identifier (URI) pointing to a file within a server in the network, and the web application adding a policy with this information to a policies table. The network collector polls a database engine for a new policy and computes a list of cable modems to have their firmware updated, and the network collector sends a command to a cable modem to update to a new firmware, wherein the new firmware is specified by the URI.

In another embodiment, a method for updating firmware of cable modems in a network consisting of a web application, network collector, cable modems, HTTP or HTTPS servers, the method comprises the steps of: the web application receiving a list of cable modems to be updated, the list containing the MAC address identifying each cable modem, and URI that includes a TFTP, HTTP or HTTPS server in the cable network and the filename for the firmware; the web application looking up the network collector to which each cable modem in the list connects, and commanding the network collector to update the cable modem to the firmware version at the time the cable modem reboots, the cable modem rebooting and starting the provisioning process, the CMTS learning the cable modem is provisioning and relaying this information to the web application, the web application validating that the cable modem is in the list of cable modems to be updated and asking the network collector to update the cable modem using the firmware URI, the cable modem connecting to the server and downloading the firmware; applying the update and rebooting; the network collector learning that the cable modem reboots from the CMTS, scanning the cable modem and learning whether the update was successful by comparing older and new firmware versions; and the network collector sending this information to the web application.

In accordance with another embodiment, a method is provided for providing automatic firmware updates by a service provider to a cable operator, where a cable operator network comprises a plurality of cable modems each connected to cable modem termination systems (CMTS), the method comprising the steps of: adding and configuring a VAS router to the cable operator network, the VAS router configured by the service provider, providing the capabilities of a network collector and connected to a VAS server through an edge router; the web application receiving an update firmware policy, the policy defined by a list of cable modems to have their firmware updated, a Uniform Resource Identifier (URI) pointing to a file within a server in the network, and the web application adding a policy with this information to a policies table; the network collector within the polling a database engine for a new policy and computing a list of cable modems to have their firmware updated; and the network collector sending a command to a cable modem to update to a new firmware, wherein the new firmware is specified by the URI.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present invention provides a system and method for providing automatic firmware update management. In order to overcome the problems and shortcomings of the prior art, the present system and method provides a manager utilizing a set of procedures to track different cable modem hardware versions, the firmware they run to strategically implement the updates, and track the success rate of this strategy.

Figure 1:
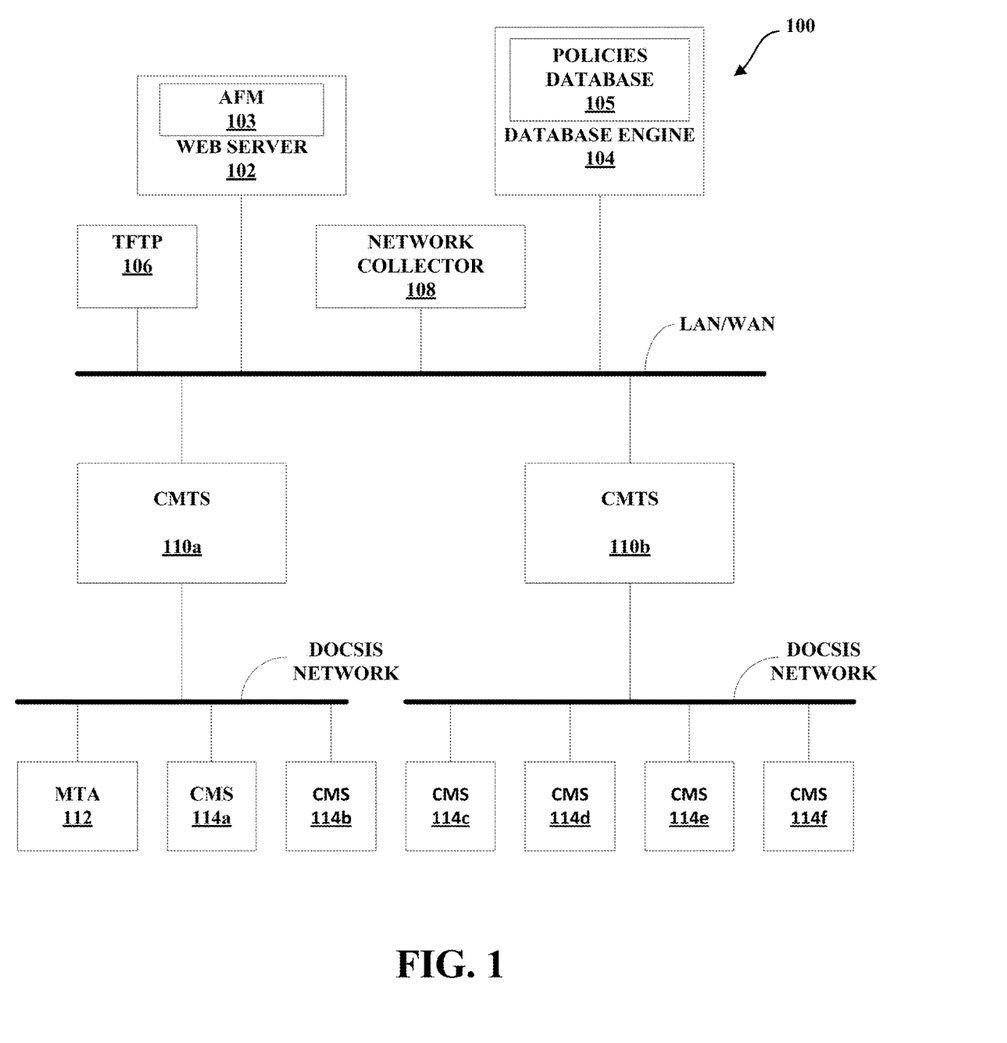
FIG. 1 is a schematic diagram of a first embodiment of the present invention illustrating an exemplary private network and nodes therein.

A private network is deployed by or for the cable operator, and the private network runs according to the DOCSIS standard. FIG. 1 is a schematic diagram illustrating an exemplary private network 100 and nodes therein. As illustrated by FIG. 1, the nodes in the private network include, but are not limited to, a web server 102, a database engine 104, a trivial file transfer protocol server (TFTP) 106, a network collector 108, cable modem termination systems 110a, 110b, a number of multimedia terminal adapters (MTAs) 112, and a number of cable modems 114a-114f A brief description of each of these nodes is provided hereinafter.

Cable modems (CMs) are pieces of hardware that run firmware and perform services for the subscribers on behalf of the cable operator. A cable modem typically has an identifier, such as, but not limited to, a Media Access Control (MAC) address.

Web servers run a set of applications for the cable operator, and in the present system and method contain a manager having functionality described herein as the Automatic Firmware Management application (AFM). The AFM and associated functionality is described in detail herein, however a number of the features of the AFM include: the capability of managing firmware updates by allowing users of a web application to create firmware update policies establishing what are the updates that need to be pushed to what cable modems; monitoring firmware updates in real time by connecting to other network equipment that performs firmware updates over the cable modems and keeping tabs of update attempts and results; producing reports for firmware update attempts, including, but not limited to, successful updates, failures, and their reasons; managing the configuration for the network including, but not limited to, the network topology; configuring and monitoring defense criteria including but not limited to restricting the amount of firmware updates to be performed in a time lapse, disabling firmware updates for cable modems that have an ongoing telephone conversation, but also detecting cable modems that fall into a loop of failed firmware updates; and, allowing file downloads, for example, of firmware files, from cable modems.

Database engine stores data and serve applications, including the AFM and the network collectors. In particular, it includes a devices table or devices inventory which stores information for all the cable modems, including but not limited to, MAC address, vendor name, model, firmware version, when was this information updated, if the cable modem was online or offline at that time, et cetera. It also contains an update policies table or policies table.

Cable modem termination systems (CMTSs) are broadband routers that connect to cable modems through coaxial or optical fiber cable, convert their signals to the IP protocol and transmit to an (IP) router. This CMTS-IP router pair connects cable modems to other equipment in the network.

Trivial File Transfer Protocol servers (TFTPs) host firmware versions for cable modems.

Dynamic Host Configuration Protocol (DHCP) servers are mainly in charge of dynamically distributing IP addresses to the cable modems.

Network collectors (or network collector servers) are servers spread throughout the cable operator's network to perform firmware-update management tasks as commanded by a web application.

Multimedia terminal adapters (MTA), or embedded multimedia adapters, include a cable modem and an (embedded) component in charge of providing the (voice over IP) telephony service to cable modems.

Updating on Boot

Figure 2:
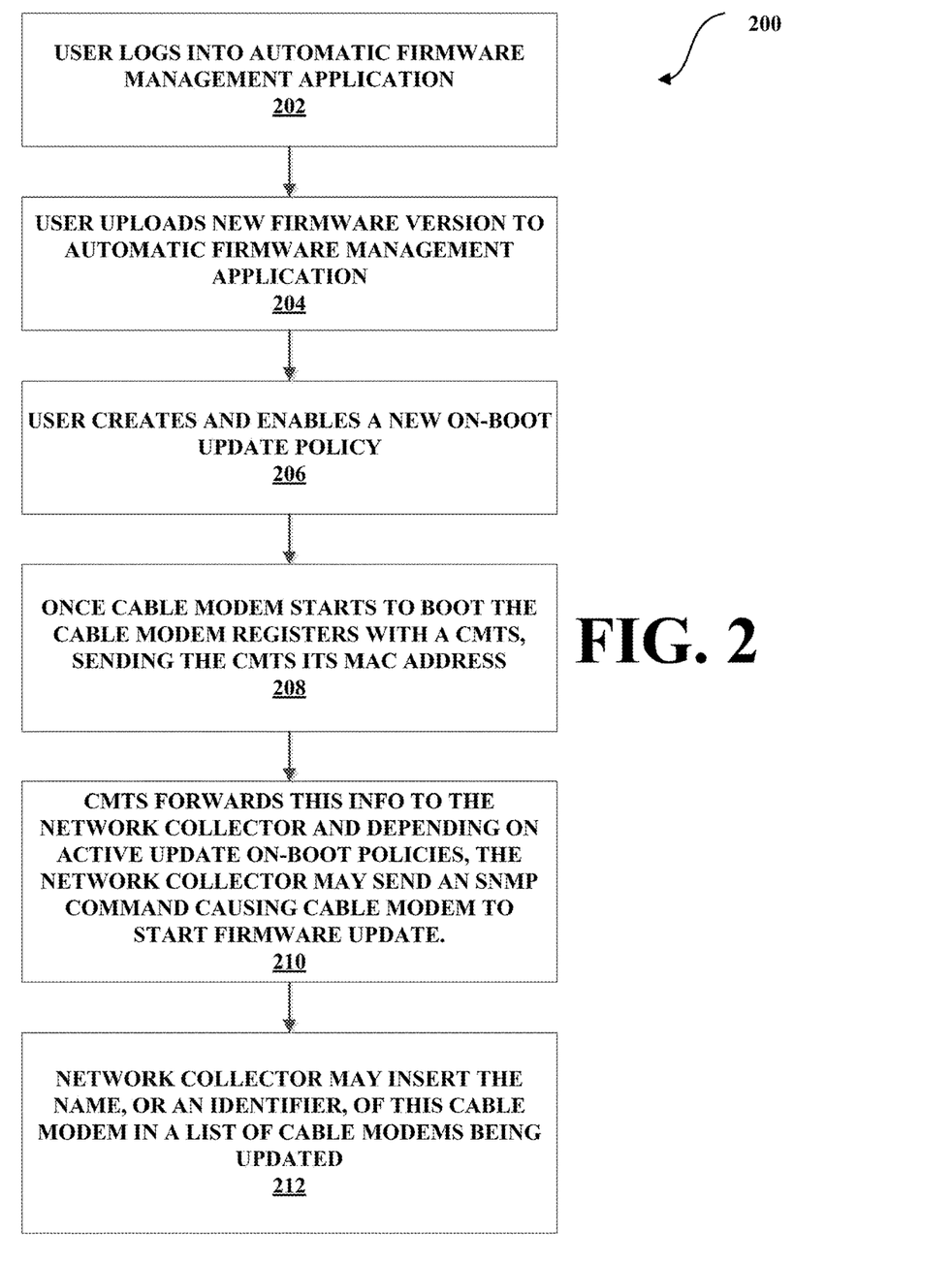
FIG. 2 is a flowchart illustrating a method for updating firmware for a cable modem during booting of the cable modem.

FIG. 2 is a flowchart 200 illustrating a method for updating firmware for a cable modem during booting of the cable modem. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

As shown by block 202, a user, acting on behalf of the cable operator, logs into the Automatic Firmware Management application 103 located on the Web server 102 via a device, such as, but not limited to, a stand-alone computer, a hand held mobile computing device, or another device. As referred to herein, a user may be, for example, an employee, or other party, acting on behalf of the cable operator. The user may be an information technology (IT) support individual responsible for loading new firmware, activating policies, checking for cable modem failures, etc.

The user then uploads a new firmware version to the Automatic Firmware Management application 103 (block 204). For exemplary purposes, a web application may be used to log into the Automatic Firmware Management application 103, although the invention is not limited to this.

Using the Automatic Firmware Management application 103, as shown by block 206, the user creates and enables a new on-boot update policy. This policy may be for, but is not limited to, updating all or a particular subset of the cable modem population (the population including all the cable modems that connect to the network) to a specific cable modem firmware version during a given time frame, as set by the user, during which updates can take place. In each case, the policy includes a specific URI that describes the location of the firmware file (underlying the update).

The subsets of the cable modem population may include, but is not limited to: a) a set of the cable modem population having certain MAC addresses; b) a portion of the cable modem population having one or more identified firmware versions; c) the portion of the cable modem population having one or more tuples of hardware versions, vendors and model of cable modems; d) a portion of the cable modem population located in one or more regions, where a region is a set of cable modems defined by the cable operator (for example, regions may be defined by, but not limited to, geographical locations); and, e) the portion of the cable modem population having one or more CMTS servers or MAC domains, or any combination of the above. Of course, other criteria may be used to define a subset of the cable modem population.

Additionally, the new on-boot firmware update policy may define a maximum number of firmware updates allowed to run during a period of time, which—for example—by default the maximum number of updates that are started in the last 60 minutes is 500, meaning that once 500 updates are reached since 12:00 no new update is run until 13:00. This maximum number of updates, and the time frame, are configured by the user when he sets up the new policy. Once the policy has been defined, it is inserted by the AFM in a policies table 105 in the database engine 104.

In a first embodiment of the present invention, the network collector 108 periodically polls the policies table 105 in the database engine 104 for new update on boot policies. Once the network collector 108 receives a new policy, it may query the devices table or other tables in the database engine 104 in order to get information for all the cable modems within its network segment for which the policy applies. The network collector 108 then computes a list of identifiers of all the cable modems to be updated for this policy which at least includes their MAC address. For example, it may query the database engine 104 to obtain the MAC addresses of all the CISCO cable modems that run one specific firmware version. The network collector 108 maintains a list of cable modems to be updated, and what is the policy commanding this update.

As shown by block 208, once a cable modem 114 starts to boot, the cable modem 114 registers with a CMTS 110 and in the process sends to the CMTS 110 its MAC address. The CMTS 110 forwards this information to the network collector 108 and depending on the active update on-boot policies (that is if the cable modem is in the list of cable modems to be updated, and the underlying policy is an update on-boot policy), the network collector 108 may send an SNMP command causing the cable modem 114 to start a firmware update (block 210). Optionally, the network collector 108 may insert the name, or an identifier, of this cable modem 114 in a list of "cable modems being updated" (block 212). The update procedure is described in an upcoming section under the title "Booting".

Updating According to a Schedule

Figure 3:
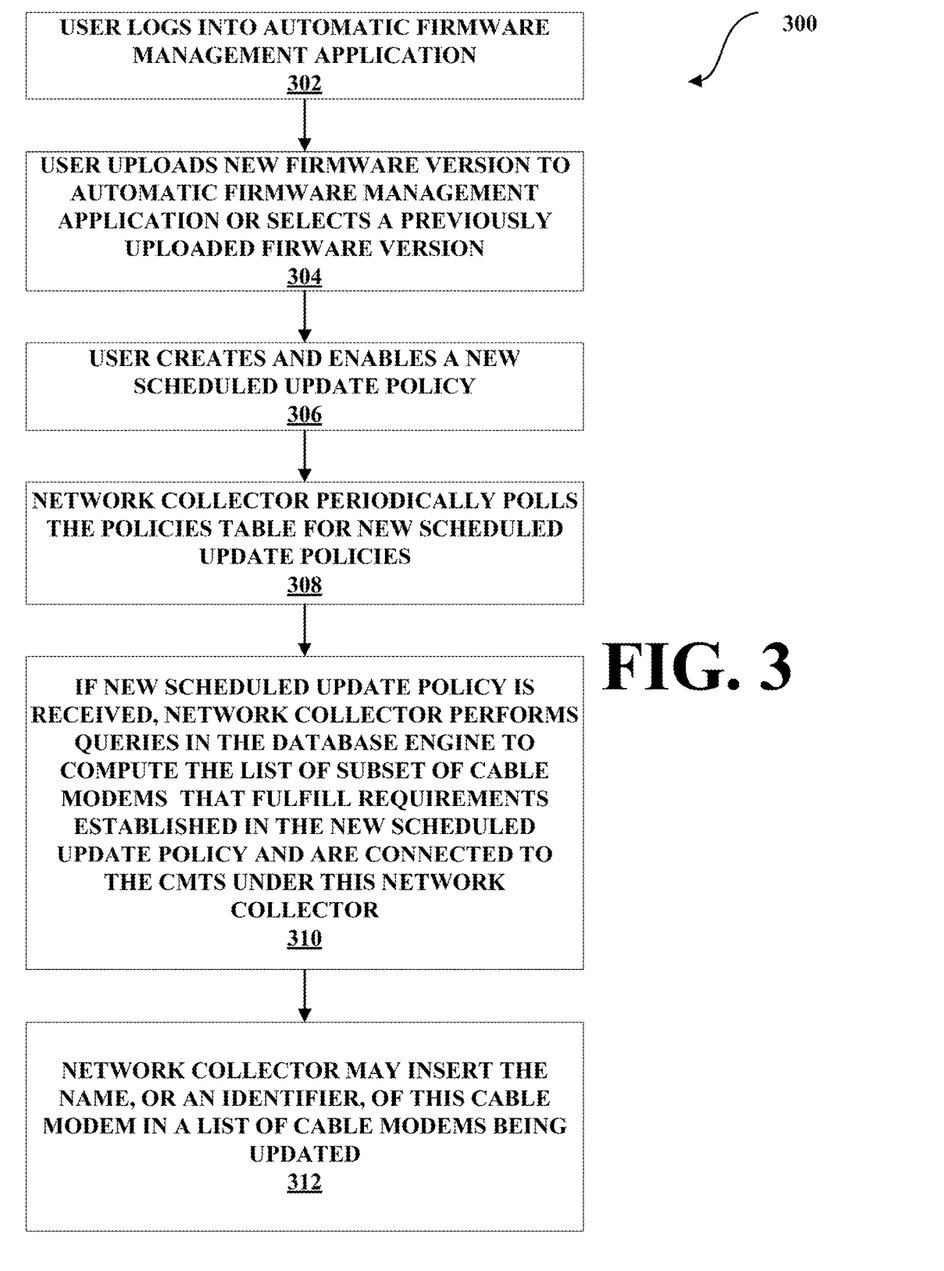
FIG. 3 is a flowchart illustrating a method for updating firmware for a cable modem according to a predefined schedule during booting of the cable modem.

FIG. 3 is a flowchart 300 illustrating a method for updating firmware for a cable modem according to a predefined schedule during booting of the cable modem.

As shown by block 302, a user logs into the Automatic Firmware Management application 103 located on a Web server 102 via a device, such as, but not limited to, a stand-alone computer, a hand-held mobile computer device, or another device. The user then uploads a new firmware version to the Automatic Firmware Management application 103 or selects one of the previously uploaded firmware versions (block 304). Again, for exemplary purposes, a web application may be used to log into the Automatic Firmware Management application 103, although the invention is not limited to this.

Using the Automatic Firmware Management application 103, as shown by block 306, the user creates and enables a new scheduled update policy. This policy may be for, but is not limited to, updating all or a particular subset of the cable modems population to a specific cable modem firmware version during a given time frame during which updates can take place. The subsets of the cable modem population may include, but not limited to: a) a set of the cable modem population having certain MAC addresses; b) a portion of the cable modem population having one or more identified firmware versions; c) the portion of the cable modem population having one or more tuples of hardware versions, vendors and model of cable modems; d) a portion of the cable modem population located in one or more regions, where a region is a set of cable modems defined by the cable operator (for example, regions may be defined by, but not limited to, geographical locations); and, e) the portion of the cable modem population having one or more CMTS servers or MAC domain for a CMTS, or any combination of the above. Of course, other criteria may be used to define a subset of the cable modem population.

Additionally, the new scheduled update policy may define a maximum number of firmware updates allowed to be executed during a period of time. To this effect, the user defines an integer M acting as this maximum and a second integer T which defines the time period. This means that every time that in the last T minutes the amount of updates reaches M, the network collector 108 will (momentarily) pause from commanding new updates. New policies are inserted into the policies table by the AFM.

As shown by block 308, the network collector 108 periodically polls the policies table in the policies database 105 for new scheduled update policies, as illustrated by FIG. 3. If the network collector 108 receives a new scheduled update policy, as described above, the network collector 108 will perform queries in the database engine in order to compute the list of the subset of those cable modems that fulfill the requisites established in the new scheduled update policy and are connected to the CMTSs under this network collector (block 310), and adds these cable modems (i.e., their identifiers, for example, their MAC addresses) to the table of cable modems to be updated together with the underlying policy. The network collector 108 will iterate over this list of cable modems during the lifetime of the new scheduled update policy until all of the cable modems are all updated (or removed from the list).

Optionally the system and method may be configured so that, at each iteration, the network collector 108 checks if there is a telephone conversation on the way using an MTA 112 in the cable modem being checked. If this happens, the network collector 108 does not start an associated firmware update. If no telephone conversation is happening or if this feature is not enabled, the network collector 108 sends SNMP commands to the cable modem causing it to download a new firmware file from a specific TFTP 106 or HTTP server—as specified in the underlying update policy. Once the cable modem downloads the new firmware file from the specific URI, the cable modem automatically reboots using the new firmware file. Also, the network collector 108 inserts the name of this cable modem in a list of "cable modems being updated", which is stored in the memory of the network collector (block 312). What happens next is referred to as booting, as is described in detail below.

Booting

When a cable modem 114 boots, the cable modem 114 starts a registration process including ranging with a CMTS 110 and establishing with it a communication channel. The cable modem 114 then interacts with DHCP and TFTP servers 106 to connect to the IP network and download a cable modem configuration file.

The CMTS 110 is configured to communicate with the network collector 108 using the Simple Network Management Protocol (SNMP for short) and pass down information particular of the cable modem 114 when a cable modem 114 registers or deregisters. During a cable modem 114 registration, the CMTS 110 sends an SNMP trap to the network collector 108 with information, such as, but not limited to, status of the cable modem 114 (e.g., registered, offline), the MAC address for the cable modem 114, and the IP address and the system uptime for the CMTS 110. Because the network collector 108 learns when a cable modem 114 registers and becomes online, the network collector server 108 then accesses the cable modem 114 through the SNMP protocol to get more detailed information including the vendor, model, and version for the cable modem 114, as well as the firmware version.

The network collector 108 then polls the policies table for policies or may alternatively look for policies that are in the list of cable modems to be updated stored in network collector's memory cache. For each active policy, the network collector server 108 decides whether the cable modem 114 that is being booted must have its firmware version updated according to this policy. If this is the case, the network collector server 108 initiates an update of the cable modem firmware version. If this is an update on-boot policy, then the network collector server 108 sends SNMP set commands to the cable modem 114, which causes the cable modem 114 to download the new firmware version specified in this update on-boot policy from the URI specified, that belongs to a TFTP server 106 or HTTP/HTTPS server. Once the cable modem downloads the new cable modem firmware file, a flag is written in the memory of the cable modem and the cable modem 114 automatically reboots. Also, the network collector server 108 inserts the name of this cable modem 114 in a list of "cable modems being updated." During reboot the cable modem 114 notices the flag and tries to load and use the downloaded firmware.

If the cable modem 114 that is booting is already in the list of cable modems being updated, the network collector server 108 will send SNMP requests to the cable modem 114 to learn if the update was successful or not, what is the firmware version it is running. Moreover, if the update was successful, the network collector will learn that the firmware version has changed—and thus, that the update was successful- and remove the cable modem from the list of cable modems that must be updated if the update was unsuccessful (and the firmware version did not change), the network collector server 108 will request logs that document the failure and its reasons. In any case, the network collector server 108 will remove the cable modem 114 from this list of cable modems 114 being updated.

The network collector server 108 maintains a tally of successful firmware updates per policy, specifically, a tally for successful firmware updates for the new schedule update policy and a separate tally for successful firmware updates for the on-boot update policy. When the ratio of successful updates for one of the policies drops below a predefined threshold, as defined by the user using the AFM, then the network collector server 108 disables the associated policy.

In order to control the effects that massive updating has on the cable operator's network, an "anti-throttling" feature is provided by the present system and method, which works as follows. Two parameters are set: a threshold T (an integer) and a frequency F (another integer). Periodically, the network collector server 108 computes the number of cable modem firmware updates executed by the network collector server 108 within the last F minutes and will again disable the policy if the number of updates exceeds this threshold T.

Moreover, the system AFM application is also able to detect when a cable modem 114 enters into an interminable loop of failed updates. Specifically, the network collector server 108 will keep a tally of failed attempts for each cable modem 114. When the number of failed attempts exceeds a threshold, for example, B, then the network collector server 108 removes, or filters out, this cable modem 114 from the list of devices to be updated and will not attempt an update any more. (It also resets the tally for this cable modem.) What is more, the network collector server 108 will take note of the details of this cable modem 114 and the failure so that this information can be included in the failure reports and statistics.

Reports and Statistics

The Automatic Firmware Management application 103 interacts with both, users, typically connecting through web browsers, and with network collector servers 108 through a set of services. The network collector servers 108 are in charge of keeping the automatic firmware management application up to date. That is, network collector servers 108 connect to the AFM 103 to provide new information about the update procedures gone by, including: hardware and firmware versions reported during each cable modem 114 boot, a list of all the update attempts paired with the policy provoking the update, whether it was successful or it failed, a timestamp and some other parameters. The automatic firmware management application 103 can then provide a variety of reports, including but not limited to those described below.

Auto Discovery

As soon as the Automatic Firmware Management application 103 and network collector servers 108 are started, the system can take a snapshot of the current network status and update this status as cable modems become online.

Once the network collector 108 and automatic firmware Management application 103 are started, each network collector 108 interacts with all the CMTSs 110 connected to it. For each CMTS 110, the network collector 108 will require a list of the cable modems 114 connected to this CMTS 110. The network collector 108 then sends SNMP commands one by one to each of the cable modems 114 asking for their MAC address, vendor, model and firmware version. After this procedure is done, the network collector 108 will pass this information to the Automatic Firmware Management application 103.

The Automatic Firmware Management application 103 is permanently interacting with the network collector 108 and receiving updated cable modem information in real time. Every 30 minutes (or any other period of time configured into the AFM) the network collectors 108 repeat the procedure of asking the CMTS 110 for the list of cable modems 114 connected to them and, for every new cable modem 114, sending SNMP commands to learn the hardware vendor, model and version of the cable modem 114, and also the firmware version it runs. The new information is maintained in the database engine, e.g., in the devices table, and is available for the AFM at any time.

Update Visualization

Since the Automatic Firmware Management application 103 learns from the network collector 108 when a cable modem firmware update happens, the AFM 103 is then capable of answering when each update happened, what was the CMTS 110 involved, whether the update was successful or not, what is the underlying policy, the make and model of the cable modem 114, and other details. It should be noted that once the network collector 108 participates in updating a cable modem 114, the network collector 108 passes the information to the automatic firmware management application 103. This may be performed almost in the same instant.

The automatic firmware management application 103 is capable of providing visualizations for updates applied including, but not limited to:

for each policy, their success rate, i.e., a pie chart of successful vs unsuccessful updates, or a line chart describing successful and unsuccessful updates over time.

a pie chart, or other visual representation, describing all the update failure motives and their percentage with respect to the update failure population. This can be done per each policy or over a given period of time.

A network chart describing the number of active cable modems 114, and how they are connected to the different CMTS 110 and network collectors servers 108.

The hardware vendor, model and version for each cable modem 114. Also the firmware this cable modem runs.

A line chart, or other visual representation, describing successful and failed updates per policy over time.

A pie chart describing the percentage of cable modems with each different firmware versions (as an example, 10% run Cisco v1, 20% run Cisco v1.2, etc.).

More importantly, these visualization features are connected to the policy management feature set so that, based on the helpful visualization, a user can disable a policy which is not working, or modify the policy to improve its results.

Using VAS Server and Router

Figure 5:
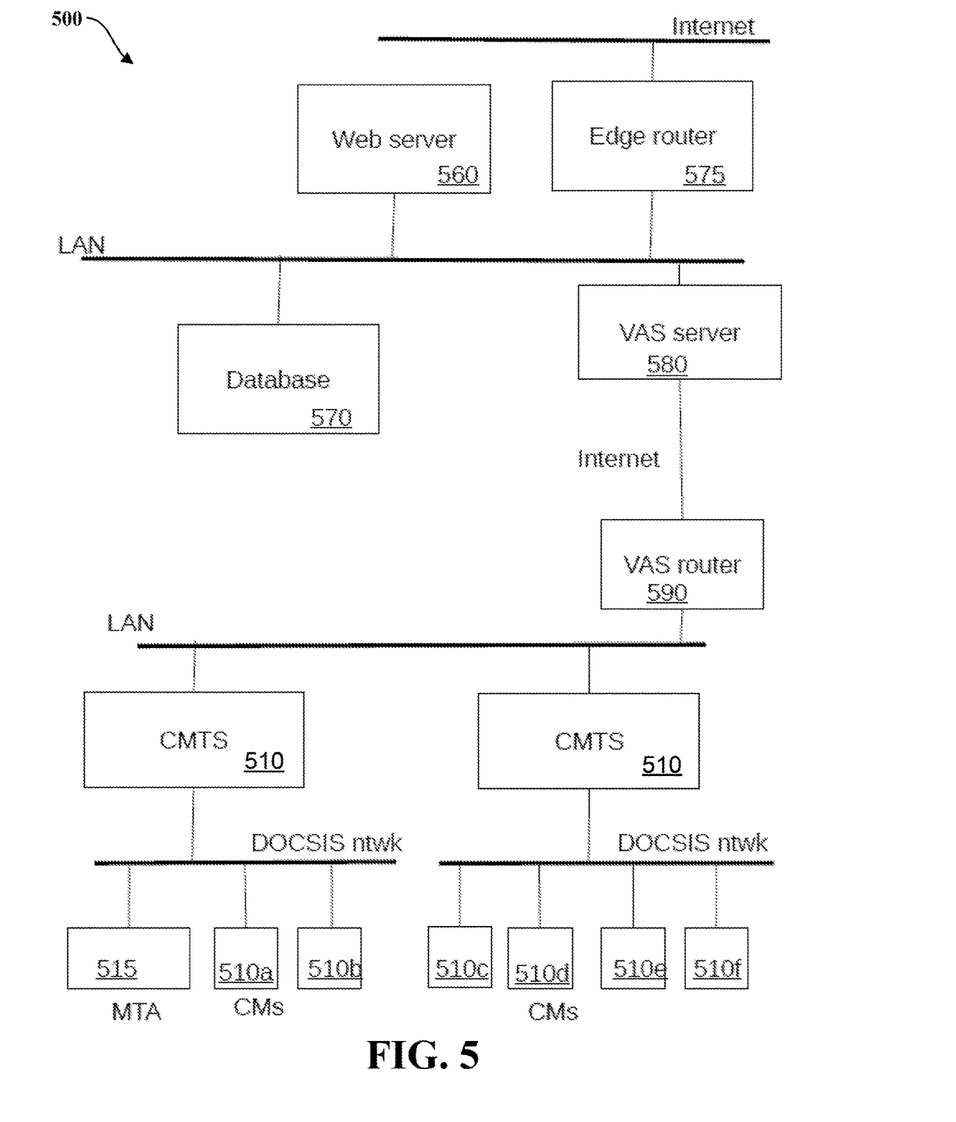
FIG. 5 is a schematic diagram showing an exemplary network of a cable operator for deploying a second embodiment of the present invention.

FIG. 5 shows a second network 500 that is a variation of the network 100 of FIG. 1 to illustrate a second embodiment of the automatic firmware update system and method. A value-added services (VAS) router 590 is a network device which provides a secure channel over the Internet between the local network consisting of all the CMTS 510 and a VAS server 580, located in the cloud/internet. The VAS router 590 also provides the functionality of a TFTP (or an HTTP/HTTPS) server and of a network collector.

The value-added services (VAS) server 580 is a network device that provides a secure channel over the Internet between the VAS router 590 and the cloud services, including but not limited to database and web applications, and in particular, the AFM. When the network collector needs to communicate with the database engine, web application or other components that connect to the VAS server, it is done through the VAS router-VAS server channel.

The network 500 under the second embodiment may be implemented by a company providing services to cable operators. As described earlier regarding the network 100 under the first embodiment (shown in FIG. 1), the service provider may install new equipment in the network 100 (FIG. 1) of the cable operator and configure devices to work as described earlier. Alternatively, the cable operator may only add to their architecture a configured VAS router 590, as pictured in FIG. 5. The VAS server 580 and remaining services may all be provided by the services company. In this case, the CMTSs must be configured to connect to the network collector within the VAS router, e.g., when a new CM goes offline or online.

More explicitly, assume the cable operator runs a cable network 500. As in the first embodiment, a user acting on behalf of the cable operator, logs into the AFM and adds a new firmware update policy, either on-boot or scheduled. The network collector in the VAS router periodically polls the policies table in the database engine for new policies. For every new policy, the network collector queries database engine in order to compute which are the MAC addresses of the cable modems defined in the policy and adds these to the table of cable modems to be updated. It also iterates over the list of cable modems to be updated and sends SNMP commands to these cable modems commanding them to start an update.

The main difference (as compared to the first embodiment) being that the service provider installs and configures the VAS router in the cable operator's network, and implements the remaining functionality on its own network. For example, according to the second embodiment, all queries from the network collector to the database engine or the AFM go through the VAS server-VAS router channel.

It should be noted that a web server 102, the network collector server 108, and other servers in accordance with the present system and method, may be implemented in one or more of many known ways, including, but not limited to, as a computer. Herein, it has been described that the web server 102 contains a manager (AFM 103) containing functionality therein, as described hereinabove. Of course, the manager may be the web server itself, or a portion of the web server if the web server contains other functionality. Assuming that the web server 102 is the manager, the web server 102 contains a memory 402, processor 404, local bus 406, storage device 408, and any input/output devices 410, where functionality of the web server (or of the manager) may be provided for within the memory 402 of the server 102, for executing by the processor 404. An example of this is described below and illustrated by the schematic diagram of FIG. 4.

Figure 4:
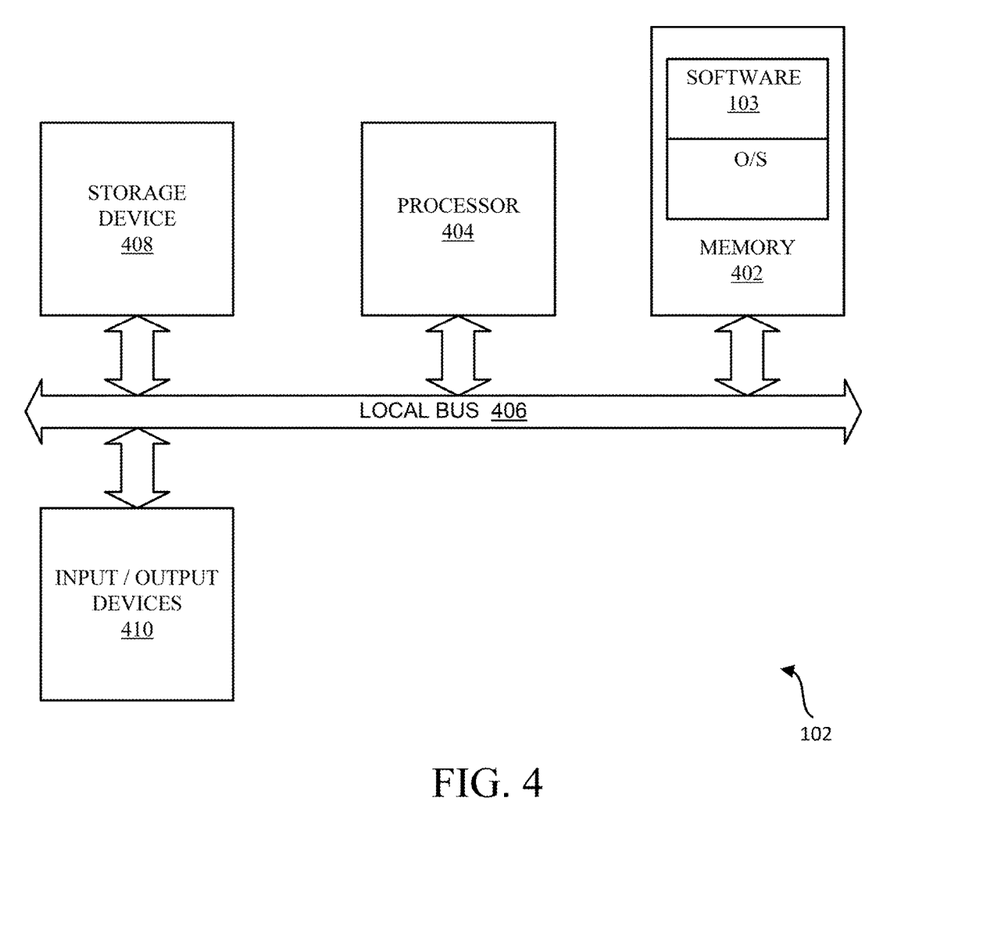
FIG. 4 is a schematic diagram illustrating the web server of FIG. 1, in accordance with the present invention.

As previously mentioned, the web server 102 may contain the processor 404, storage device 408, the memory 402 having software stored therein that defines the abovementioned functionality (the AFM 103), input and output (I/O) devices (or peripherals) 410, and a local bus 412, or local interface allowing for communication within the web server 102.

The local interface can be, for example but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor is a hardware device for executing software, particularly that stored in the memory. The processor can be any custom made or commercially available single core or multi-core processor, a central processing unit (CPU), an auxiliary processor among several processors associated with the present computer, a semiconductor based microprocessor (in the form of a microchip or chip set), a macroprocessor, or generally any device for executing software instructions.

The memory can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remotely from one another, but can be accessed by the processor.

The software defines functionality performed by the server, for example, the automatic firmware management application functionality, in accordance with the present invention. The software in the memory may include one or more separate programs, each of which contains an ordered listing of executable instructions for implementing logical functions of the automatic firmware management application. Alternatively, portions of the functionality of the automatic firmware management application may be separate logical devices within a computer, as opposed to programs in the memory.

The memory may contain an operating system (O/S). The operating system essentially controls the execution of programs within the server and provides scheduling, input-output control, file and data management, memory management, and communication control and related services.

The I/O devices may include input devices, for example but not limited to, a keyboard, mouse, scanner, microphone, etc. Furthermore, the I/O devices may also include output devices, for example but not limited to, a printer, display, etc. Finally, the I/O devices may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the computer is in operation, the processor is configured to execute the software stored within the memory, to communicate data to and from the memory, and to generally control operations of the computer pursuant to the software, as explained above.

When the functionality of the computer is in operation, the processor is configured to execute the software stored within the memory, to communicate data to and from the memory, and to generally control operations of the computer pursuant to the software. The operating system is read by the processor, perhaps buffered within the processor, and then executed.

When the automatic firmware management application is implemented in software, it should be noted that instructions for implementing the application can be stored on any computer-readable medium for use by or in connection with any computer-related device, system, or method. Such a computer-readable medium may, in some embodiments, correspond to either or both the memory or the storage device. In the context of this document, a computer-readable medium is an electronic, magnetic, optical, or other physical device or means that can contain or store a computer program for use by or in connection with a computer-related device, system, or method. Instructions for implementing the application can be embodied in any computer-readable medium for use by or in connection with the processor or other such instruction execution system, apparatus, or device. Although the processor has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the automatic firmware management application is implemented in hardware, the manager can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

We claim:

1. A method for optimizing resources in a network comprising a web application, a network collector server configured to perform firmware-update management tasks as commanded by the web application, a plurality of cable modems, and one or more servers while updating firmware of the plurality of cable modems, the method comprising the steps of:
    the web application receiving a firmware update policy, the firmware update policy comprising a cable modem criteria describing all of or a subset of the plurality of cable modems to have their firmware updated, and a Uniform Resource Identifier (URI) pointing to a firmware update file within a server in the network;
    the web application adding the firmware update policy to a database engine;
    the web application allowing a user to view statistical information selected from the group consisting of visual representations of failed attempts and the make or model of the cable modem, number of failed or successful upgrade attempts over time, and the number of failed or successful attempts for cable modems in each different Cable Modem Termination System (CMTS);
    the network collector server polling the database engine for the firmware update policy and computing a list of cable modems to have their firmware updated according to the firmware update policy, the list comprising a subset of the plurality of cable modems;
    the network collector server sending a command to each cable modem in the list to update its firmware using the firmware update file indicated by the URI;
    the network collector learning that the cable modem reboots, scanning the cable modem, and learning whether a firmware update was successful by comparing older and new firmware versions; and
    the network collector sending this information to the web application,
    wherein the URI further comprises a network location of the firmware update file, the firmware update policy further comprises an update time frame, and the cable modem criteria includes at least one of a group consisting a MAC address, a MAC domain, a firmware version, a hardware version, a vendor, a model, a region, and a subset of CMTS Internet Protocol (IP) addresses associated with the cable modems.

2. The method of claim 1, further comprising the steps of:
    the network collector server learning that a cable modem is booting from a CMTS;
    the network collector server comparing the identification of this cable modem with the list of cable modems to be updated on boot; and
    the network collector server sending a command to the cable modem so that it downloads a firmware file in a URI specified in the firmware update policy and rebooting using the downloaded firmware file as its firmware.

3. The method of claim 1 where the one or more servers are one or any of Trivial File Transfer Protocol server (TFTP) and Hypertext Transfer Protocol (HTTP) or Hyper Text Transfer Protocol Secure (HTTPS).

4. The method of claim 1, further comprising the steps of:
    the network collector server receiving the cable modem criteria; and
    the network collector server querying the database engine in order to obtain a list of cable modem MAC addresses defined by the cable modem criteria.

5. The method of claim 1, further comprising the steps of:
    configuring a time range in the web application for the firmware update policy; and
    the list of cable modems to be updated depends on whether current time is within the time range.

6. The method of claim 5, further comprising the steps of:
    the network collector server obtaining a time zone for each cable modem based on a geographical location of a Cable Modem Termination System (CMTS) they connect to; and
    adjusting the current time so that it fits the cable modems.

7. The method of claim 1, further comprising the step of:
    the network collector server scanning the cable modem and learning if the cable modem has an embedded Multimedia terminal adapter (MTA); and
    if any telephone lines in the MTA is in use, the network collector not sending a command to update the cable modem when the telephone line is in use.

8. The method of claim 1 further comprising the steps of:
    the network collector server configured with two throttling parameters, integers N and T;
    the network collector server keeping tabs of how many cable modems it commands to update every minute; and
    stopping to command new firmware updates when the number of updates in the last N minutes exceeds second parameter (threshold) T.

9. The method of claim 1, wherein the cable modem fails to update at every attempt, further comprising the steps of:
    the web application configured with a parameter B, an integer;
    the web application increasing a failed-attempts counter on every failed update for the cable modem; and the web application removing the cable modem from the list of cable modems to be updated once the failed-attempts counter reaches the number B.

10. The method of claim 1, the method further comprising the steps of:
the web application receiving a list of cable modems to be updated, and a pair of integers N and M;
the web application counting a number of times it asks the network collector to update a cable modem in the last N time period; and
the web application stopping commanding updates from the network collector if the counter reaches integer M.

11. The method of claim 1, further comprising the step of:
the web application maintaining in a database management system at least one of a group consisting of a table of successful and failed upgrade attempts including a MAC address of the cable modem, a make and model, a firmware version before the upgrade attempt, and the firmware version used for updating.

12. The method of claim 1 wherein the web server is configured with a policy failure threshold, an floating point number T, further comprising the step of:
the web server terminating the update task, not sending any more update requests, if a ratio of cable modems with failed update attempts with respect to update attempts is bigger that the threshold T.

13. The method of claim 1, wherein an identifier identifying each cable modem is a Media Access Control (MAC) address.

14. The method of claim 1, wherein the network collector server learns that the cable modem reboots from a Cable Modem Termination System (CMTS), and the network collector server sending the update firmware command to the cable modem depending on this information.

15. The method of claim 1, further comprising the step of:
the cable modem applying the new firmware and rebooting.

16. A method for updating firmware of a plurality of cable modems in a network consisting of a web application, a network collector server configured to perform firmware-update management tasks as commanded by the web application, the plurality of cable modems, HTTP or HTTPS servers, the method comprising the steps of:
the web application receiving a list of a subset of cable modems of the plurality of cable modems to be updated, the list containing a MAC address identifying each of the subset of cable modem, and a Uniform Resource Identifier (URI) that includes a TFTP, HTTP or HTTPS server in the cable network and a filename for a firmware update;
the web application looking up the network collector server to which each cable modem in the list connects, and commanding the network collector server to update each cable modem in the list at the time the cable modem reboots;
the web application allowing a user to view statistical information selected from the group consisting of visual representations of failed attempts and the make or model of the cable modem, number of failed or successful upgrade attempts over time, and the number of failed or successful attempts for cable modems in each different Cable Modem Termination System (CMTS);
the cable modem rebooting and starting a provisioning process;
the CMTS learning the cable modem is provisioning and relaying this information to the web application;
the web application validating that the cable modem is in the list and asking the network collector server to update the cable modem using the firmware URI;
the cable modem connecting to the server and downloading the firmware;
applying the update and rebooting;
the network collector learning that the cable modem reboots from the CMTS, scanning the cable modem and learning whether the update was successful by comparing older and new firmware versions; and
the network collector sending this information to the web application,
wherein the URI further comprises a network location of the firmware update file, the firmware update policy further comprises an update time frame, and the cable modem criteria includes at least one of a group consisting a MAC address, a MAC domain, a firmware version, a hardware version, a vendor, a model, a region, and a subset of Cable Modem Termination System (CMTS) Internet Protocol (IP) addresses associated with the cable modems.

17. A method for providing automatic firmware updates by a service provider to a cable operator, where a cable operator network comprises a plurality of cable modems each connected to cable modem termination systems (CMTS), comprising the steps of:
adding and configuring a VAS router to the cable operator network, the VAS router configured by the service provider, providing the capabilities of a network collector server configured to perform firmware-update management tasks and connected to a VAS server through an edge router;
the web application receiving a firmware update policy, the firmware update policy comprising a cable modem criteria describing all of or a subset of the plurality of cable modems to have their firmware updated, a Uniform Resource Identifier (URI) pointing to a firmware update file within a server in the network, and the web application adding a policy with this information to a policies table;
the web application allowing a user to view statistical information selected from the group consisting of visual representations of failed attempts and the make or model of the cable modem, number of failed or successful upgrade attempts over time, and the number of failed or successful attempts for cable modems in each different CMTS;
the network collector server polling a database engine for the firmware update policy and computing a list of cable modems to have their firmware updated according to the firmware update policy, the list comprising a subset of the plurality of modems; and
the network collector server sending a command to each cable modem in the list to update its firmware using the firmware update file indicated by the URI,
wherein the URI further comprises a network location of the firmware update file, the firmware update policy further comprises an update time frame, and the cable modem criteria includes at least one of a group consisting a MAC address, a MAC domain, a firmware version, a hardware version, a vendor, a model, a region, and a subset of CMTS Internet Protocol (IP) addresses associated with the cable modems.

* * * * *